United States Patent
Katz

Patent Number: 5,814,767
Date of Patent: Sep. 29, 1998

[54] FLEXIBLE PLASTIC DUCTING AND METHOD FOR MAKING AND FORMING SAME

[75] Inventor: Neal Katz, Wheeling, Ill.

[73] Assignee: Richco Inc., Chicago, Ill.

[21] Appl. No.: 838,652

[22] Filed: Apr. 9, 1997

[51] Int. Cl.⁶ .................................................. H05K 9/00
[52] U.S. Cl. ............................................................. 174/68.1
[58] Field of Search .............................. 174/68.1, 95, 96, 174/97, 101

[56] References Cited

U.S. PATENT DOCUMENTS

| | | | |
|---|---|---|---|
| 4,423,284 | 12/1983 | Kaplan | 174/101 |
| 4,530,865 | 7/1985 | Sprenger | 428/36 |
| 5,581,047 | 12/1996 | Lazaroff | 174/35 R |

*Primary Examiner*—Bot L. Ledynh
*Assistant Examiner*—Joseph Waks
*Attorney, Agent, or Firm*—Martin Faier; Faier & Faier

[57] ABSTRACT

A coilable length of insulating material adapted to be set up for forming a duct to contain wire-like members extending along its length, wherein the length has a plurality of spaced apart longitudinally extending scores, the space between the scores defining top and bottom and side walls of the duct, and a adhesive strip arranged along the length for securing the walls of the duct set up when connected between at least two of the walls. A wall overlying the top wall may be adhesively secured to it for securing the duct in set up position. The length may be cut to any desired length. The length may also have another adhesive strip along one of the walls for securing the set up duct to a selected surface. The duct may be mitered by cutting it laterally for tracking corners and non-planar surfaces. The invention also relates to the method for making and setting up such a duct.

14 Claims, 1 Drawing Sheet

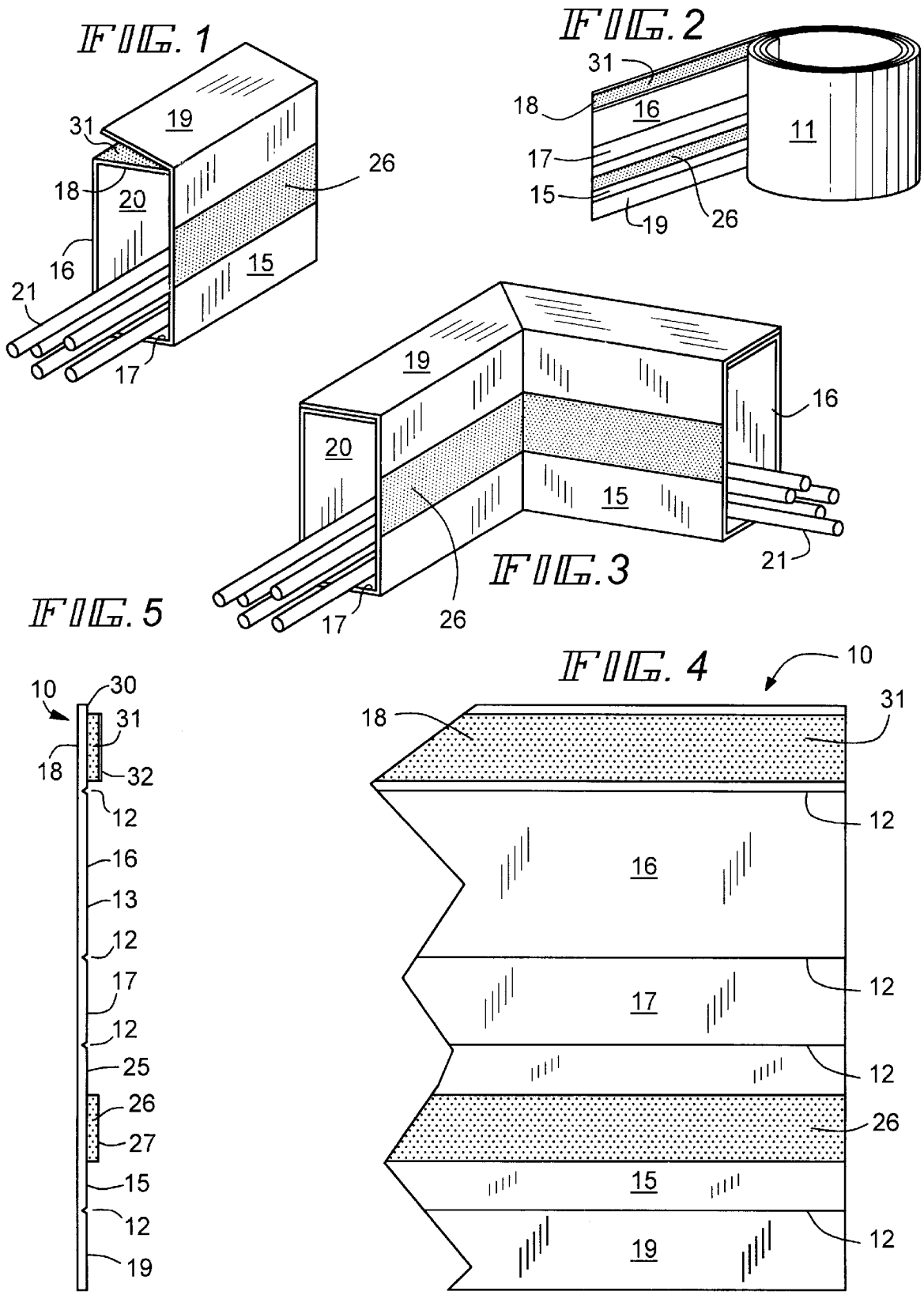

FLEXIBLE PLASTIC DUCTING AND METHOD FOR MAKING AND FORMING SAME

This invention relates to flexible plastic ducting for housing computer cables, communications and home entertainment system wiring, and other systems where it is desirable to hide, insulate, segregate or contain wiring and the like in a defined raceway. The method relates to making and forming such flexible plastic ducting.

BACKGROUND OF THE INVENTION

Ducting for containing bundles of wire and the like frequently comprises a series of interfitting walls, covers, fittings and securing members for forming and closing the ducts. Such prior art structures are found in Frank U.S. Pat. No. 1,988,965 and Thwaites et al U.S. Pat. No. 4,093,818. Other prior art raceways have U-shaped plastic channels into which wires may be placed to insulated or separate them from a chassis or other surface, and require special covers to close the channels, such as those disclosed in Caveney et al U.S. Pat. No. 5,134,250. The prior art also teaches one piece ducts like Santucci et al U.S. Pat. No. 5,235,136, where an axially extending channel has a built-in co-extensive cover member which is adaptable for snap closing in the channel, but is multidimensional in form. Others, like Plummer U.S. Pat. No. 3,092,530, disclose a one piece sheath which is rolled into a cylinder-like structure for containing wires or similar components, with a lateral edge closable by tape for encircling the wire, but which cannot be easily secured to a surface without special hangers or the like.

All of these prior art structures require that the duct be specially formed or fabricated to length, or require extensive effort or special tools or other structure to open and close them, or involve so many parts as to make the overall duct of heavier weight that required to accomplish the desired job. Additionally, many of these prior art structures involve the use of special hangers and other fixtures or means for closing or installing the ducts on an underlying surface. These known prior art ducts also lack convenient integral closure and installation systems. As important, prior art duct systems usually require maintenance of special inventories of component parts in the field and lack the versatility for shipping and storing duct forming material, irrespective of the length of the end duct desired. Field installation of these prior art ducts usually require dedicated tools to form the duct to a desired length and more than a scissors or knife must be on hand to cut the duct to length or install it or open or close it or miter it at a desired position to follow an underlying surface.

SUMMARY OF THE INVENTION

In the present invention, the ducting materials are fabricated into a single extended strip and formed into a roll. The length of material is made to bend naturally longitudinally to define longitudinally extending side and top and bottom walls of the duct, and has applied to its appropriate surfaces adhesive strips which may be exposed for closing the duct and securing the closed duct to a selected wall or machine surface. Before closing, the duct material can be scissor or knife cut to a selected length, and when formed into a duct, the duct can be easily mitered by notching it laterally to accommodate turns in an underlying or other surface to which the duct is attached.

Thus the present invention overcomes many of the known problems of the prior art. Only a single selected length of extruded plastic material is necessary to create the duct embodying the present invention, without the necessity of special fittings, closures or covers, or mounting or hanger members. Ducts of many lengths can be set up from a single roll of duct material. No special tools are required to set up the duct, as it can be cut to length and notched or mitered with just a conventional scissors or knife. The duct is closed by pressure sensitive adhesives which are easy to open and close many times before the adhesive loses its strength, thus permitting reuse or addition or removal or repair of wires or the like enclosed by the duct. The plastic material from which the duct is fabricated insulates the duct from surrounding surfaces and may be fabricated from plastic which is able to retard fire, flame and extreme temperatures. The material is relatively of light weight so that substantial supporting structure is not required to form and hold the wires or other contained components in the duct or the duct itself in place.

OBJECTS AND ADVANTAGES OF THE INVENTION

It is the object of the invention to provide a duct for containing wires and other components of the character described, and to provide a method for fabricating and forming such a ducts from a length of duct material.

Another object is to provide a raceway which can be made from a single length of material in a strip-like configuration and set up with integral top and bottom and side walls.

Another object is to provide a flat length of duct material which can be fabricated, transported and stored in a single roll form.

Another object is to provide a flat length of duct material which has longitudinally extending integral defined means for forming top and bottom and side walls members.

Another object is to provide a flat length of duct material which has an integral adhesive element for closing the duct into a raceway with top and bottom and side wall members.

Another object is to provide a flat length of duct material which has an integral adhesive member for mounting the formed raceway duct onto an underlying selected surface.

Another object is to provide a flat length of duct material which has secured to selective longitudinal surfaces strips of adhesive material, which when formed is covered by removable strips protecting the adhesive surfaces, which may be activated by removal of such strips to expose the adhesive.

Another object is to provide a duct which can be easily opened and closed and reopened and closed at will to insert or remove wires or other components therein.

Another object is to provide a method for fabricating a duct system by extruding a length of plastic insulating material having integral defined longitudinally extending top and bottom and side wall members.

Another object is to provide a method for fabricating an integral duct by applying a length of adhesive to a length of flat plastic insulating material having members defining the duct walls.

Another object is to provide a method for securing an integral duct to a selected surface by applying a length of adhesive to a length of flat plastic insulating materials having members defining the duct walls.

Another object is to provide a method of mitering a duct having integral top and bottom and side walls by laterally notching of one or more of said walls to conform the duct to an underlying surface.

Another object is to provide a method for erecting a duct from a length of flat plastic material by bending the length along longitudinally arranged score lines defining the duct walls to set up the duct, closing the bent set up length by adhesively fixing the surface between score lines along a predetermined path of adhesive material to form a raceway, and securing the formed raceway to a selected underlying surface by adhesively securing the raceway to said surface by means of an adhesive strip secured to the length of material.

Another object is to provide flexible plastic ducting which is simple, efficient and inexpensive to make, store, ship and use, without special tools or experience.

These and other objects and advantages of the invention will become more apparent as this description proceeds, taken in conjunction with the accompanying drawings.

BRIEF DESCRIPTION OF THE DRAWINGS

In the drawings:

FIG. 1 is a perspective view of a duct embodying the present invention, about to be closed and ready for mounting on a surface.

FIG. 2 is a perspective view of a roll of duct material before forming into a duct with the adhesive applied, but without its overlying protective strips.

FIG. 3 is a perspective view of a formed duct mitered for mounting on a non-planar surface.

FIG. 4 is a plan view of the face of a strip of duct material, without the adhesive protective strip.

FIG. 5 is a side view of the strip of duct material, with the adhesive protective strip.

DESCRIPTION OF A PREFERRED EMBODIMENT

A strip 10 of plastic material from which the raceway will be formed may be extruded or otherwise formed into a roll 11, and the strip may be formed with longitudinally extending spaced apart scores 12, slots, cuts or v-grooves, which do not penetrate the entire strip wall 13, but which will define an inside wall 15, an outside wall 16, a bottom wall 17, a top wall 18 and an overlying closure wall 19 of the duct when set up. As shown in FIG. 1, when set up as a duct or raceway 20, a bundle of wires 21 or other components may be laid into the duct.

The inside wall 15 has on its outer surface 25 a body of adhesive 26, which may be protected by a covering 27 of wax paper or similar material. The outside surface 30 of the top wall 18 may have applied to it a body of adhesive 31 (or double sided adhesive tape) which is protected by a wax paper or similar strip 32.

The roll 11 may be cut laterally in the field to form a strip 10 of the length of the desired duct 20, and then the duct may be set up by bending the strip along the score lines 12, thus forming the outside and inside and top and bottom walls 15–18, whereupon the covering strip 32 on the top wall 18 is removed, allowing the duct 20 to be closed by pressing the overlying wall 19 against the adhesive body 31.

Likewise, when it is desire to mount the formed duct 20 onto a surface, such as a furniture or chassis wall (not shown), the covering 32 is removed to expose the adhesive body 27 on the outside surface of the wall 15, and pressed against that surface to hold the duct in selected mounting position.

Where it is desire to add wires or components to or remove them from the duct 20, the overlying wall 19 is lifted from the top wall 18, thus exposing the interior of the duct, for installation or removal of such wires 21 therefrom, at which point the duct is closed again by pressing the overlying wall against the top wall.

As shown in FIG. 3, should it be desired to run the duct 20 around a corner or along a non-planar surface, the bottom, top and overlying and inside walls 15 and 17–19, respectively, may be cut and mitered to suit along the miter joint 35. Such a mitering procedure may be used for most duct configurations requiring mitered outside or inside corners.

While a preferred embodiment of the invention has been shown and described in considerable detail, it should be understood that many changes can be made in the structure without departing from the spirit or scope of the invention. Accordingly, it is not desired that the invention should be limited to the exact structure shown and described.

I claim:

1. A length of insulating material cut off a coiled strip, said length forming a channel-like duct open at both ends for containing wire-like members extending along said length, said length comprising;

series of spaced apart parallel score lines longitudinally arranged along said length, said score lines defining top, bottom and side walls of said duct, said length being foldable along said score lines to form said duct when folded, and a longitudinally extending adhesive strip arranged along said length and securing said walls formed into said duct when connected between at least two of said walls.

2. In the length of material referred to in claim 1, wherein said score lines are arranged only on one side of said length of material.

3. In the length of material referred to in claim 2, wherein all of said top, bottom and side walls are foldable inwardly with respect to one another.

4. In the length of material referred to in claim 1, wherein a mounting strip of adhesive for securing the set up duct to a selected surface is arranged to an outer surface of one of said walls.

5. In the length of material referred to in claim 4, wherein said mounting strip is covered by a removable strip of material which can be removed to expose the adhesive when mounting said duct to a surface.

6. In the length of material referred to in claim 1, wherein said length can be cut laterally to form a duct of selected length.

7. In the length of material referred to in claim 1, wherein said length can be laterally notched across one or more of said walls to conform said duct to an underlying surface.

8. In the coilable length of material recited in claim 1, wherein said length has an overlying wall over said top wall when said duct is formed.

9. In the length of material referred to in claim 8, wherein said adhesive strip is secured to said top wall beneath said overlying wall.

10. In the length of material referred to in claim 9, wherein said adhesive strip is covered by a removable strip of material which can be removed to expose the adhesive.

11. A longitudinally extending one piece raceway duct formed from a length of material wherein said length is cut off a coiled strip, said duct being open at both ends for containing wire-like members extending along said length, said duct comprising;

connected top, bottom and side walls, each of said walls arranged adjacent another of said walls, an additional wall connected to one of said side walls and overlying said top wall, said top wall having an adhesive strip secured to its top surface and the additional wall overlying said top wall, and an adhesive mounting strip arranged on an outside surface of one of said side walls for mounting said duct on a selected underlying surface.

12. In the raceway recited in claim 11, wherein said walls and said additional wall are divided from one another by longitudinally extending score lines.

13. In the raceway recited in claim 11, wherein said mounting strip is arranged on one face of said raceway.

14. In the raceway recited in claim 11, wherein said adhesive strip extends longitudinally coaxially with said raceway.

* * * * *